3,689,362
ENZYMATIC METHOD FOR MANUFACTURE OF FRUCTOSE

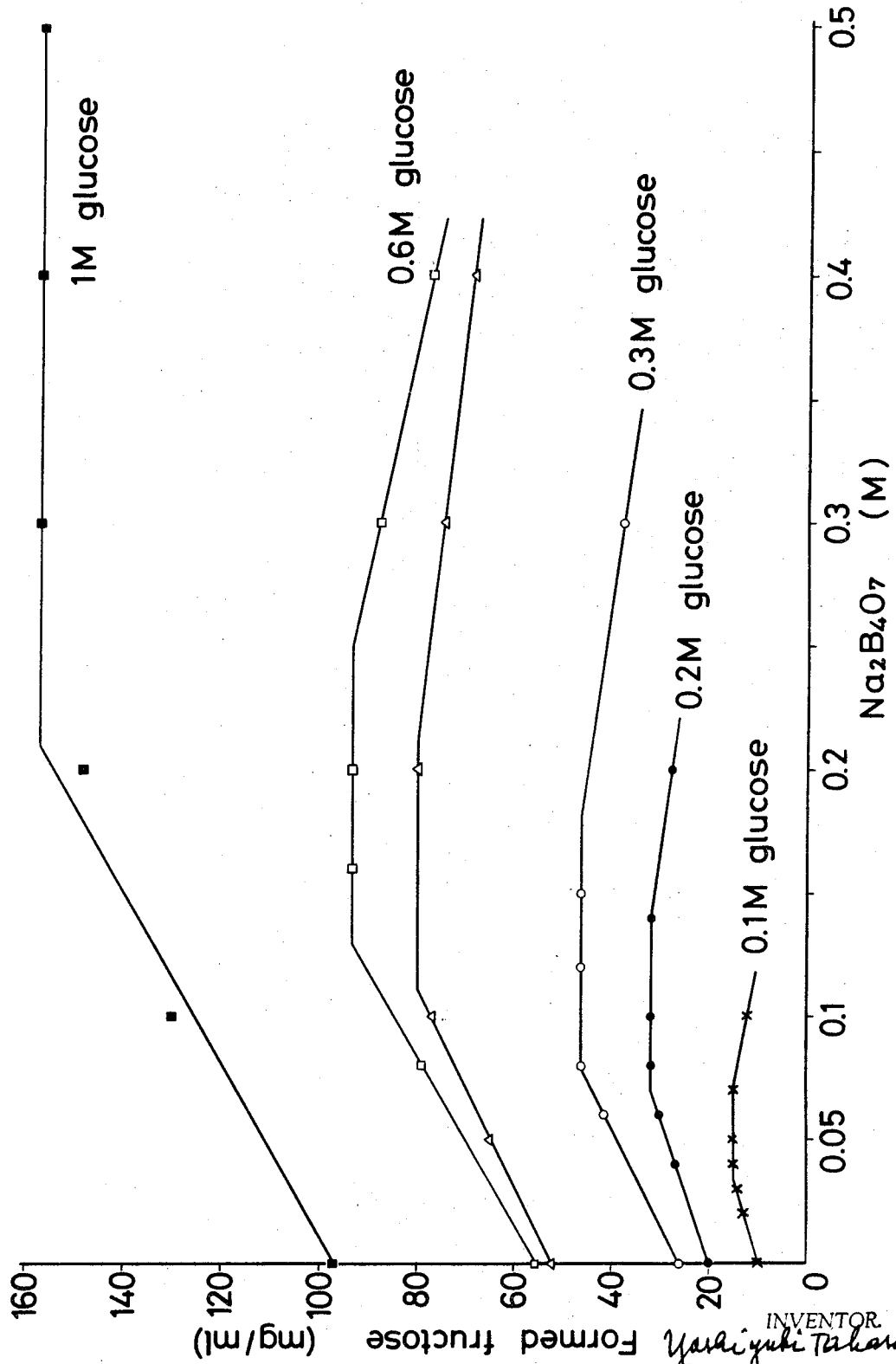

Yoshiyuki Takasaki, Chiba-shi, Japan, assignor to Agency of Industrial Science & Technology, Tokyo, Japan
Filed Nov. 23, 1970, Ser. No. 92,046
Claims priority, application Japan, Nov. 25, 1969, 44/94,493
Int. Cl. C12b 1/00
U.S. Cl. 195—31 R    8 Claims

ABSTRACT OF THE DISCLOSURE

A method in an enzymatic reaction for the isomerization of glucose into fructose, for the manufacture of fructose from glucose or glucose containing solution which comprises effecting the reaction in the presence of a borate compound.

---

This invention is concerned with an enzymatic method for the manufacture of fructose from glucose. More particularly, the present invention relates to a method for the manufacture of fructose which comprises enzymatically isomerizing glucose to fructose in the presence of a borate compound.

Formerly, the inventor found a method for the production of glucose isomerase (general name for an enzyme which catalyzes the reversible conversion between glucose and fructose) and a method for the manufacture of fructose-containing syrup from glucose by the use of the said glucose isomerase. This enzyme is produced by cultivating Streptomyces such as *Streptomyces albus* or *Streptomyces rubiginosus* which are capable of assimilating xylan or xylose in a culture medium containing xylose, xylan and xylan containing materials such as wheat bran, corn cobs, corn husk, etc. The isomerization reaction between glucose and fructose which is catalyzed by this glucose isomerase is reversible and the ratio of glucose to fructose in the reaction solution is constant at a given temperature. This equilibrium moves slightly in the direction of fructose with the rising temperature of reaction. At the usual reaction temperature (70° C.), the composition of sugar in the reaction mixture in the state of equilibrium is 53–56% of fructose and 47–44% of glucose. The yield of fructose can be increased over this ratio either by raising the reaction temperature or by removing the formed fructose from the reaction system and adding a suitable substance to the reaction system.

An object of the present invention resides in providing a method which isomerizes glucose into fructose at an exceptionally high yield by reacting in the presence of borate compound, and which permits recovery of the used borate compound from the reaction solution. Consequently, this method enables the manufacture of fructose with great economic advantage.

Other objects and other characteristics of the present invention will become apparent from reading the following more detailed description referring to the accompanying drawing.

The drawing indicates the relationship between the amount of sodium tetraborate added and the amount of fructose produced from glucose at each indicated glucose concentration.

The borate compounds which can be used for this invention include such water-soluble borates as sodium borate and potassium borate of various types (such as orthoborate, metaborate and tetraborate), such borates insoluble or sparingly soluble in water as magnesium borate, lithium borate, barium borate, strontium borate, calcium borate and manganese borate, and esters formed from organic compounds such as alcohol or phenol and boric acid. Anion-exchange resins of the borate form can be used as well. Magnesium and barium borate are insoluble or sparingly soluble in water and do not inhibit the reaction even when large quantities of these salts are added to the reaction solution. Therefore, the isomerization reaction can be carried out at high glucose concentration. Thus, use of these salts proves more advantageous in applying the method of this invention to industrial operation. As to the time that the borate compound is added to the reaction system, it is more desirable to add it from the beginning. It is otherwise possible to add the compound at the time that the formation of fructose has progressed to some extent or at the time that the reaction has reached its equilibrium.

The quantity of the borate compound to be added must be changed with the kind of borate compound to be used but has a close relationship with the concentration of the glucose. Referring now to the drawing, at 0.3 M of glucose concentration, about 54% of the glucose was converted to fructose when the isomerization reaction was carried out in the absence of sodium tetraborate, while at the same glucose concentration, about 87% of the glucose was converted to fructose when the reaction was carried out in the presence of 0.08–0.2 M of sodium tetraborate. The quantity of fructose produced decreased when the borate was added to the same concentration of as glucose (0.3 M). When the isomerization reaction was carried out at 1 M of glucose concentration without the addition of sodium tetraborate, about 55% of the glucose was converted to fructose. About 72% of the glucose was converted to fructose when the reaction was carried out in the presence of 0.1 M of sodium tetraborate. When 0.2 M of sodium tetraborate was added at the same glucose concentration, the isomerization ratio rose to about 87%. However, the formation of fructose was no longer increased beyond this ratio when sodium tetraborate was added further. Namely, it was found that there is an optimum range of concentration of borate to be added for obtaining the maximum isomerization ratio.

Table 1 shows the minimum quantity of sodium tetraborate added to obtain the maximum isomerization ratio at different concentrations of glucose. The minimum quantity for each concentration was determined from the graph shown in the drawing.

TABLE 1

| Glucose concentration $A$, M | Minimum concentration of sodium tetraborate (M) required for obtaining maximum production of fructose at indicated concentration of sugar $B$ | $(B)/(A) \times 100$ (percent) |
|---|---|---|
| 0.1 | ca. 0.04 | ca. 40 |
| 0.2 | ca. 0.07 | ca. 35 |
| 0.3 | ca. 0.08 | ca. 27 |
| 0.5 | ca. 0.11 | ca. 22 |
| 0.6 | ca. 0.13 | ca. 22 |
| 1.0 | ca. 0.22 | ca. 22 |

It is clear from the foregoing data that the minimum concentration of sodium tetraborate required for the maximum conversion to fructose must be more than about 35% of the sugar concentration, when the sugar concentration is below 0.3 M but that it is substantially constant at the level of about 22% where the sugar concentration exceeds 0.5 M. Addition of sodium tetraborate by more than this amount is not only unnecessary but such excessive addition inhibits the enzymatic reaction and the yield of fructose decreases. The relationship between the sugar concentration and the borate concentration for obtaining the maximum isomerization ratio varies with the kind of borate to be used. Therefore, the quantity of borate to be added is determined by the kind of borate selected. When magnesium metaborate ($Mg(BO_2)_2$) or barium tetraborate ($BaB_4O_7$) is used, practically the same isomerization ratio can be obtained by adding such borate at the same mole concentration as sodium tetraborate ($Na_2B_4O_7$). When sodium metaborate ($NaBO_2$) is used, however, the same isomerization ratio cannot be obtained unless added in a quantity nearly twice that of sodium tetraborate.

Table 2 shows the quantity of different borate compounds which must be added for isomerizing glucose to fructose at the concentration of 1 M at an isomerization ratio of 80–90%. The data clearly indicates that the required quantity of a given borate can be determined on the basis of the number of the negative charges (borate ions) or the normal concentration of the borate.

To obtain the isomerization ratio of 80–90% at a sugar concentration of 1 M, for example, sodium tetraborate must be added by a concentration of 0.1–0.4 M and sodium metaborate by a concentration of 0.2–0.8 M. It is found that both concentrations are 0.2–0.8 in terms of normal concentration. In the enzymatic reaction for isomerizing glucose into fructose, therefore, the effective concentration A (expressed as normal concentration) of a borate compound to be added at a sugar concentration exceeding at least 0.3 M can be expressed as follows.

$$0.2B < A < 0.8B$$

Where, B is the sugar concentration expressed in moles. This is equivalent to the statement that an isomerization ratio of 80–90% can obtained when a borate compound is added in such amount as a gram equivalent corresponding to more than 20% but less than 80% of the sugar concentration.

TABLE 2

| Kind of borate | Negative charge of borate | Concentration, M, of borate for obtaining 80–90% isomerization ratio | Normal concentration of borate |
|---|---|---|---|
| Sodium tetraborate | $B_4O_7^-$ | 0.1–0.4 | 0.2–0.8 |
| Potassium tetraborate | $B_4O_7^-$ | 0.1–0.4 | 0.2–0.8 |
| Sodium metaborate | $BO_2^-$ | 0.2–0.8 | 0.2–0.8 |
| Potassium metaborate | $BO_2^-$ | 0.2–0.8 | 0.2–0.8 |
| Magnesium metaborate | $(BO_2)_2^-$ | 0.1–0.2 | 0.2–0.8 |
| Barium tetraborate | $B_4O_7^-$ | 0.1–0.4 | 0.2–0.8 |

As mentioned above, when the isomerization reaction is carried out in the presence of a borate, there can be obtained a sugar solution having an exceptionally high fructose content. Having a high fructose content, this sugar solution has a higher degree of sweetness than sucrose and, therefore, can be used as a sweetening agent. Besides, it can be used as the raw material for fructose production.

Now, the description proceeds to the method of separating and recovering the borate from the borate containing sugar solution after isomerization reaction.

Boric acid is a week acid. Therefore, boric acid can be removed by the treatment using an OH-form strongly basic anion-exchange resin. However, when boric acid (or borate) is in co-existence with a sugar, boric acid (or borate) and the sugar are combined with each other to form a negatively charged complex. Therefore, if a sugar solution containing boric acid (or borate) is treated with such anion-exchange resin, not only the boric acid but also the sugar is removed proportionally with the boric acid content. As a result, the recovery of sugar is reduced. And recovery of the sugar from the ion-exchange resin, requires a more complicated process.

The inventor, therefore, purused investigation in search for a method for removing borate from the sugar solution containing borate by a different means. From the fact that free boric acid has a low solubility to water and the complex formed between the boric acid and the sugar is unstable on the acid side, the inventor discovered that more than 80% and up to 90–98% of the boric acid can be separated as a precipitate from the solution by treating the sugar solution containing borate with a cation-exchange resin or by acidifing the sugar solution containing borate to a pH below about 3 by adding mineral acid so as to cause the borate to be decomposed into boric acid and the corresponding inorganic salt. Since the inorganic salt produced is soluble, it helps to decrease the solubility of boric acid and increase the recovery thereof.

For example, a mixture containing 8.3% of fructose, 0.92% of glucose and 4.0% of sodium borate ($Na_2B_4O_7$) was divided into 100 ml. portions which were adjusted to pH 4, 3, 2, 1 and 0.5 with the addition of sulfuric acid, respectively. Each portion was concentrated under a reduced pressure to about 25 ml. and then maintained at 0—5° C. so as to form the precipitates of boric acid, which was removed by means of suction filtration. The content of glucose, fructose and boric acid in the resultant sugar solutions were examined. The results are given in Table 3.

Fructose content was determined by the cysteine-carbajole method and glucose content by the enzymatic method using glucose oxidase and the boric acid content was determined by spectrophotometry with pyrocatechol violet (Kazuo Hiiro, Journal of Japanese Chemistry, vol. 83, No. 1, pp. 81–85, 1962).

TABLE 3

| pH adjustment of sugar solution | Boric acid content (mg./ml.) | Fructose content (mg./ml.) | Glucose content (mg./ml.) |
|---|---|---|---|
| Original pH value | 46.4 | 32.6 | 9.6 |
| 4 | 7.3 | 72.4 | 8.5 |
| 3 | 5.3 | 68.4 | 8.2 |
| 2 | 3.0 | 69.6 | 8.4 |
| 1 | 3.0 | 69.4 | 8.3 |
| 0.5 | 1.9 | 70.8 | 7.9 |

It is clear from Table 3 that more than about 90% of the boric acid could be removed by the treatment adjusting the pH value of the sugar solution to below 3. At this stage, about 10% of the sugar content is removed together with boric acid. This boric acid containing sugar is neutralized with alkali and put to reuse in isomerization reaction.

The boric acid and the inorganic salt which remain in the solution after the separation of boric acid may be removed by an ordinary process as by using an ion-exchange resin, for example. Or, boric acid may be removed by distillation on the acidic side with methanol or ethanol as methyl borate or ethyl borate, which is collected by a proper alkali. Otherwise, they may be removed by means of electrodialysis using an ion-exchange membrane. From the sugar solution which is obtained by removing the greater parts of the boric acid, fructose can be crystallized. The sugar solution which is obtained by removing the greater part of boric acid in the manner mentioned above from the isomerized sugar solution containing boric acid or the sugar solution from which boric acid has not yet been removed may be subjected to a process for the removal of glucose (process whereby glucose is oxidized with glucose oxidase or bromine into gluconic acid, or glucose is removed by means of an ion-exchange resin) or to a process for the separation of fructose (process whereby fructose is separated by forming an addition compound with calcium hydroxide) for the purpose of facilitating the subsequent process of fructose crystallization from the refined sugar solution.

The glucose isomerase is an enzyme which is found in numerous kinds of microorganisms and which usually exists in microorganic cells.

The glucose isomerase which is produced by a microorganism belonging to genus Streptomyces can isomerize glucose into fructose under a wide range of reaction conditions, i.e., pH 5.5 to 11 and temperatures up to 90° C.

With due consideration for the protection of the reaction solution against coloration based on decomposition of sugar and for the maintenance of the activity of the enzyme, however, the reaction is usually carried out under conditions of pH 5.5 to 9.0 and temperatures from 60 to 80° C. Even though the isomerization reaction is carried out in the presence of a borate compound, the reaction can be carried out under entirely the same temperature and pH conditions.

Table 4 and Table 5 show the relationship between the pH value of the reaction solution and the isomerization ratio and that between the reaction temperature and the isomerization ratio which were observed when the isomerization reaction was carried out in the presence of a borate compound at various pH and various temperatures. 10 ml. samples of a reaction mixture containing of 4.5% of glucose, 4.5% of fructose, 0.005 M of $MgSO_4$, 0.002 M $CoCl_2$, 4.0% of sodium borate (as anhydride) and 1270 units of glucose isomerase were adjusted to the indicated pH values and incubated at 70° C. During the reaction the pH values of the samples were maintained at 6.0, 6.5, 7.0, 7.5, 8.0, 9.0 and 10.0, respectively. Table 4 shows the isomerization ratio in the state of equilibrium.

TABLE 4

| pH value of reaction mixture: | Isomerization ratio (percent) |
|---|---|
| 6.0 | 81.3 |
| 6.5 | 85.4 |
| 7.0 | 87.0 |
| 7.5 | 87.9 |
| 8.0 | 87.0 |
| 9.0 | 85.7 |
| 10.0 | 83.2 |

Each reaction sample mentioned above was adjusted to pH 7.1 and incubated at the different reaction temperatures of 60° C., 70° C. and 80° C., respectively. Table 5 shows the isomerization ratio in the state of equilibrium.

TABLE 5

| Reaction temperature, ° C.: | Isomerization rate (percent) |
|---|---|
| 60 | 88.0 |
| 70 | 87.9 |
| 80 | 88.0 |

As is clear from Table 4 and Table 5, the reaction temperature has virtually no effect but the pH value of the reaction mixture has a slight effect on the isomerization ratio, and the maximum isomerization ratio is obtained when the reaction is carried out in the neighborhood of pH 7.5.

Now, the present invention is described further by citing preferred embodiments thereof. This invention should not be construed as being limited to these examples.

EXAMPLE 1

Five reaction mixtures consisting of 5 g. of anhydrous glucose, 0.024% of cobalt chloride and 2300 units of glucose isomerase (measurement of activity being based on the method described in "Agricultural Biological Chemistry," vol. 30, p. 1247, 1966) were prepared. To four of the five mixtures, magnesium metaborate was added to a concentration of 0.42%, 0.83%, 1.25% and 1.69% respectively. The mixtures were made up to a total volume of 100 ml. with water and incubated at 70° C.

At definite time intervals, a prescribed amount of the test specimen was taken from each reaction solution and the contents assayed for fructose and glucose.

Table 6 shows the fructose content, glucose content and isomerization ratio in the state of equilibrium of each reaction mixture.

It is clear from this table that the isomerization ratio was about 56% in the absence of magnesium metaborate, while the isomerization ratio was raised to 70–88% when magnesium metaborate was added to the reaction solution.

TABLE 6

| Amount of magnesium borate, $Mg(BO_2)_2$, added (percent) | Fructose content (g./100 ml.) | Glucose content (g./100 ml.) | Fructose plus glucose content (g./100 ml.) | Isomerization ratio (percent) |
|---|---|---|---|---|
| 0 | 2.80 | 2.20 | 5.00 | 56.0 |
| 0.42 | 3.48 | 1.46 | 4.94 | 70.4 |
| 0.83 | 4.21 | 0.98 | 5.19 | 81.1 |
| 1.25 | 4.21 | 0.67 | 4.88 | 86.3 |
| 1.67 | 4.25 | 0.58 | 4.83 | 88.0 |

EXAMPLE 2

To a mixture consisting of 5.4 g. of anhydrous glucose, 123 mg. of magnesium sulfate ($MgSO_4 \cdot 7H_2O$) and 3900 units of glucose isomerase, there was added 3.05 g. of sodium tetraborate ($Na_2B_4O_7 \cdot 10H_2O$). The resultant mixture was made up to 100 ml. with water and incubated at 70° C. (with the sugar concentration of the reaction solution at 0.3 M and the sodium tetraborate concentration at 0.16 N).

At definite time intervals, aliquots were taken from the reaction mixture, and the quantities of fructose and glucose were determined.

In the state of equilibrium, the fructose content was found to be 84.7% and the glucose content to be 15.3% respectively.

EXAMPLE 3

To a mixture consisting of 18 g. of anhydrous glucose, 123 mg. of magnesium sulfate and 3900 units of glucose isomerase, there was added 9.54 g. of sodium tetraborate. The resultant mixture was made up to a total volume of 100 ml. with water and then incubated at 70° C. (with the sugar concentration in the reaction solution at 1 M and the sodium tetraborate concentration at 0.50 N).

At definite time intervals, aliquots were taken from the reaction solution and the sugar composition was analyzed. In the state of equilibrium, the fructose content was found to be 87.0% and the glucose contents to be 13.0% respectively.

EXAMPLE 4

To a mixture consisting of 9 g. of anhydrous glucose, 123 mg. of magnesium sulfate and 3900 units of glucose isomerase, there was added 3.24 g. of potassium tetraborate ($K_2B_4O_7 \cdot 5H_2O$). The resultant mixture was made up to a total volume of 100 ml. with water and then incubated at 70° C. (with the sugar concentration in the reaction solution at 0.5 M and the potassium tetraborate concentration at 0.2 N).

At definite time intervals, aliquots were taken from the reaction solution and the sugar composition of the reaction mixture was analyzed. In the state of equilibrium, the fructose content was found to be 89.7% and the glucose content to be 10.3% respectively.

EXAMPLE 5

To a mixture consisting of 9 g. of anhydrous glucose, 123 mg. of magnesium sulfate and 3900 units of glucose isomerase, there was added 3.07 g. of barium tetraborate. The resultant mixture was made up to a total volume of 100 ml. with water and then incubated at 70° C. (with the sugar concentration in the reaction solution at 0.5 M and the barium tetraborate concentration at about 0.2 N, considering that the barium tetraborate was not dissolved in the reaction solution at first but was found to be completely dissolved therein by the time the reaction had been completed).

At definite time intervals, aliquots were taken from the reaction solution and the sugar composition of the reaction mixture was analyzed. Consequently, the fructose content was found to be 89.5% and the glucose content to be 10.5% respectively in the state of equilibrium.

EXAMPLE 6

To an invert sugar consisting of 9 g. of glucose and 9 g. of fructose, there were added 123 mg. of magnesium sulfate, 3900 units of glucose isomerase and 9.54 g. of sodium tetraborate. The resultant mixture was made up to a total volume of 100 ml. with water and then incubated at 70° C. (with the sugar concentration in the reaction solution at 1 M and the sodium tetraborate concentration at 0.50 N).

At definite time intervals, aliquots were taken from the reaction solution and the sugar composition of the reaction mixture was analyzed. Consequently, the fructose content was found to be 88.3% and the glucose content to be 11.7% respectively in the state of equilibrium.

EXAMPLE 7

A mixture consisting of 10 g. of Amberlite IRA–410 (made by Rohm and Haas Company) in the borate form, 5 g. of glucose and 3600 units of glucose isomerase was made up to a total volume of 100 ml. with water and incubated at 70° C.

The resultant isomerized solution was analyzed. The results of the analysis are shown in Table 7. Compared with the 53.5% isomerization ratio of the control, that of the reaction solution which was carried out in the presence of the borate form anion-exchange resin showed the isomerization ratio of 69.3%.

TABLE 7

| Presence or absence of borate form anion-exchange resin | Fructose content (percent) | Glucose content (percent) |
| --- | --- | --- |
| No resin | 53.5 | 46.5 |
| Resin added | 69.3 | 30.7 |

EXAMPLE 8

This example is to illustrate the result of the continuous isomerization which was carried out by using a column which was packed with anion-exchange resin in the borate form and cells containing glucose isomerase.

A double-wall column made of glass was packed with 30 g. of Amberlite IRA–410 in the borate form and 30 g. of cells containing glucose isomerase, with hot water at 70° C. circulated inside the outer wall. Into the column, a sugar solution consisting of 5% of glucose, 5% of fructose and 0.024% of cobalt chloride was fed at a flow rate of about 5 ml./hour. The results of analysis of the isomerized solution thus obtained are shown in Table 8.

It is clear from the table that the isomerization ratio of the sugar solution was 60–66%.

EXAMPLE 9

A double-wall column made of glass was packed with 30 g. of cells containing glucose isomerase and 30 g. of barium tetraborate, with hot water at 70° C. circulated inside the outer wall. Into the column, a sugar solution consisting of 10% of invert sugar 0.001 M of cobalt chloride and 0.005 M of magnesium sulfate was fed at a flow rate of 5–10 ml./hour. The sugar composition of the resultant isomerized sugar solution is shown in Table 9.

It is clear from this table that the isomerization ratio of the sugar solution was 62–89%.

TABLE 9

| Fraction Number | Fraction volume (ml.) | Flow rate (ml./hr.) | Fructose (mg./ml.) | Glucose (mg./ml.) | Glucose plus fructose (mg./ml.) | Isomerization ratio (percent) |
| --- | --- | --- | --- | --- | --- | --- |
| 1 | 57 | 10.4 | 61.5 | 19.9 | 81.4 | 75.6 |
| 2 | 87 | 9.7 | 69.2 | 20.6 | 89.8 | 77.1 |
| 3 | 78 | 6.2 | 76.7 | 23.4 | 90.3 | 88.9 |
| 4 | 83 | 6.6 | 64.4 | 40.2 | 104.6 | 61.6 |

EXAMPLE 10

A mixture consisting of 10 g. of anhydrous glucose, 246 mg. of magnesium sulfate, 7800 units of glucose isomerase and 2.8 g. of magnesium metaborate was made up to a total volume of 200 ml. with water and then incubated at 70° C.

The sugar solution obtained (containing 7.6% of fructose, 0.64% of glucose and 1.4% of magnesium borate) was adjusted to a pH value of about 1.5 by addition of hydrochloric acid, concentrated under a reduced pressure to about 37 ml. and then, allowed to stand at −5° C. to −10° C. so as to form the precipitates of boric acid. The boric acid produced was removed by means of suction filtration. The resultant sugar solution (200 ml. in volume) was found to contain 6.9% of fructose, 0.58% of glucose and 0.24% of boric acid. Subsequently, calcium hydroxide was added to this sugar solution under cooling, and the fructose was precipitated as fructose-calcium complex. The complex was washed with a small volume of cold water, suspended in water and neutralized with carbon dioxide and the calcium carbonate produced was removed by filtration. Consequently, 10.4 g. of fructose was obtained.

EXAMPLE 11

A mixture consisting of 8 g. of anhydrous glucose, 123 mg. of magnesium sulfate, 3600 units of glucose isomerase and 7.6 g. of sodium tetraborate was made up to a total volume of 100 ml. with water and then incubated at 70° C. After the reaction, the resultant sugar solution consisting of 7.1% of fructose and 0.94% of glucose was treated with glucose oxidase and glucose present therein oxidized into gluconic acid. The solution was thereafter adjusted to a pH value of 1 by addition of sulfuric acid, and concentrated to about 22 ml. and was then allowed to stand at −5° C. to −10° C. so as to form precipitates of boric acid, which were removed by filtration. The

TABLE 8

| Fraction Number | Fraction volume (ml.) | Flow rate (ml./hr.) | Fructose (mg./ml.) | Glucose (mg./ml.) | Glucose plus fructose (mg./ml.) | Isomerization ratio (percent) |
| --- | --- | --- | --- | --- | --- | --- |
| 1 | 24 | 5.0 | 40.4 | 30.8 | 71.2 | 56.7 |
| 2 | 96 | 5.6 | 47.7 | 24.5 | 72.2 | 6.13 |
| 3 | 37 | 5.3 | 47.2 | 27.6 | 74.8 | 6.23 |
| 4 | 41 | 5.1 | 52.4 | 31.2 | 83.6 | 62.6 |
| 5 | 48 | 5.0 | 50.4 | 31.6 | 82.0 | 61.5 |
| 6 | 83 | 4.9 | 52.4 | 35.6 | 88.0 | 59.5 |
| 7 | 113 | 4.9 | 51.8 | 33.0 | 84.8 | 61.1 |
| 8 | 25 | 4.9 | 51.2 | 34.8 | 86.0 | 59.5 | resultant sugar solution (100 ml. in volume) was found to contain 6.2% of fructose and 0.16% of boric acid. Subsequently, excess sulfuric acid was neutralized with barium hydroxide and precipitated barium sulfate was removed. The remaining boric acid and inorganic acid and inorganic salt in the sugar solution was removed by the treatment with a cation-exchange resin and an anion-exchange resin.

EXAMPLE 12

A mixture consisting of 10 g. of anhydrous glucose, 123 mg. of magnesium sulfate, 3600 units of glucose isomerase and 7.6 g. of sodium tetraborate was made up to a total volume of 100 ml. with water and then incubated at 70° C. After reaction, the sugar solution (containing 8.5% of fructose, 1.5% of glucose and 4% of sodium tetraborate respectively) obtained was first treated with an H form Amberlite IR–120 to remove cations in the sugar solution. The treated solution was concentrated under a reduced pressure to about 25 ml. and allowed to stand at −5° C. so as to form precipitate boric acid, which was separated by filtration. The resultant sugar solution was found to contain 7.0% of fructose, 0.9% of glucose and 0.3% of boric asid. The remaining boric acid in the sugar solution was removed by the ordinary method of distillation with alcohol. The sugar composition thus obtained was 85% of fructose and 15% of glucose.

What is claimed is:

1. In the enzymatic isomerization of glucose into fructose in solution, the improvement comprising effecting the isomerization in the presence of a borate compound.

2. A method set forth in claim 1, wherein the borate compound is a compound insoluble or sparingly soluble in water.

3. A method set forth in claim 1, wherein the borate compound is a compound soluble in water.

4. A method set forth in claim 1, wherein the enzymatic reaction for the isomerization of glucose into fructose is effected with a sugar concentration of 0.3 M or more and with the addition of the borate compound having the normal concentration of more than 20% but less than 80% of the sugar concentration.

5. A method set forth in claim 1, wherein the borate compound is an anion-exchange resin of borate type.

6. A method for the enzymatic manufacture of fructose characterized in that the enzymatic reaction is continuously effected to manufacture fructose from glucose or glucose containing solution in the presence of an insoluble or sparingly soluble borate or an anion-exchange resin of borate type.

7. In the enzymatic manufacture of fructose the improvement comprising treating a glucose solution containing a cation-exchange resin of the borate form which has been isomerized in the presence of the borate compound, removing the cation from said glucose solution and educing boric acid from the treated solution.

8. In the enzymatic manufacture of fructose the improvement comprising adjusting to a pH below about 3 a glucose solution containing borate which has been isomerized in the presence of a borate compound and educing boric acid from the treatment solution.

References Cited

Yoshimura et al.: "Agr. Biol. Chem.," vol. 30, pp. 1015–23, 1966.

A. LOUIS MONACELL, Primary Examiner

G. M. NATH, Assistant Examiner

U.S. Cl. X.R.

195—114